United States Patent
Slater et al.

(10) Patent No.: US 11,778,450 B2
(45) Date of Patent: *Oct. 3, 2023

(54) MULTICAST HANDOVER FOR MOBILE COMMUNICATIONS

(71) Applicant: ViaSat, Inc., Carlsbad, CA (US)

(72) Inventors: Joshua G. Slater, Rancho Mission Viejo, CA (US); Daniel M. Newman, Littleton, MA (US); Sapna P. Mehta, San Diego, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,727

(22) Filed: Jun. 28, 2022

(65) Prior Publication Data

US 2023/0022016 A1    Jan. 26, 2023

Related U.S. Application Data

(63) Continuation of application No. 16/939,221, filed on Jul. 27, 2020, now Pat. No. 11,405,770, which is a
(Continued)

(51) Int. Cl.
*H04W 8/08* (2009.01)
*H04B 7/185* (2006.01)
(Continued)

(52) U.S. Cl.
CPC ........ *H04W 8/087* (2013.01); *H04B 7/18508* (2013.01); *H04W 28/06* (2013.01); *H04W 36/32* (2013.01); *H04W 80/04* (2013.01)

(58) Field of Classification Search
CPC ..... H04W 8/087; H04W 28/06; H04W 36/32; H04W 80/04; H04W 8/20; H04W 8/245; H04W 40/36; H04B 7/18508
See application file for complete search history.

(56) References Cited

U.S. PATENT DOCUMENTS 7,161,934 B2   1/2007   Buchsbaum et al.
7,327,989 B2   2/2008   Levinberg
(Continued)

FOREIGN PATENT DOCUMENTS

WO     2017091555 A1    6/2017

OTHER PUBLICATIONS

International Preliminary Report on Patentabiity mailed in International (PCT) Application No. PCT/US2016/063273 dated Jun. 7, 2018. 7 Pages.

(Continued)

*Primary Examiner* — Thai Nguyen
(74) *Attorney, Agent, or Firm* — HOLZER PATEL DRENNAN

(57) ABSTRACT

Embodiments provide efficient multicast handover for content delivery to client devices in multi-carrier communications systems. For example, client devices in a transport craft can consume a media channel offering via a first carrier during transport through the communications system. Embodiments can establish respective multicast groups for the media channel offering in at least the first carrier and a subsequent second carrier, and can notify the craft of the multicast groups prior to the craft being serviced by the second carrier. Such pre-notification can permit multicast handover of the media channel offering from the first carrier to the second carrier in a manner that avoids typical handover-related. For example, embodiments can direct multicast delivery of the media channel offering to the craft in accordance with the first multicast group while being serviced by the first carrier and in accordance with the second multicast group while being serviced by the second.

25 Claims, 7 Drawing Sheets

Related U.S. Application Data continuation of application No. 16/433,678, filed on Jun. 6, 2019, now Pat. No. 10,764,739, which is a continuation of application No. 15/806,483, filed on Nov. 8, 2017, now Pat. No. 10,356,600, which is a continuation of application No. 14/952,649, filed on Nov. 25, 2015, now Pat. No. 9,848,317.

(51) Int. Cl.
  *H04W 28/06* (2009.01)
  *H04W 36/32* (2009.01)
  *H04W 80/04* (2009.01)

(56) References Cited

U.S. PATENT DOCUMENTS

| | | | |
|---|---|---|---|
| 7,394,779 B2 | 7/2008 | Seo et al. | |
| 7,664,065 B2 | 2/2010 | Lu | |
| 7,827,304 B2 | 11/2010 | Park et al. | |
| 7,830,825 B2 | 11/2010 | Fu et al. | |
| 7,894,465 B2 | 2/2011 | Sasaki et al. | |
| 8,089,937 B2 | 1/2012 | Hong et al. | |
| 8,195,165 B2 | 6/2012 | Han et al. | |
| 8,279,829 B2 | 10/2012 | Xia et al. | |
| 8,320,293 B2 | 11/2012 | Zheng et al. | |
| 8,488,603 B2 | 7/2013 | Zha et al. | |
| 8,509,233 B2 | 8/2013 | Yao et al. | |
| 8,532,659 B2 | 9/2013 | Ohta et al. | |
| 8,570,978 B2 | 10/2013 | Kim et al. | |
| 8,677,439 B2 | 3/2014 | Sun et al. | |
| 8,774,130 B2 | 7/2014 | Jung et al. | |
| 8,842,685 B2 | 9/2014 | Um et al. | |
| 9,848,317 B2 | 12/2017 | Slater et al. | |
| 10,356,600 B2 | 7/2019 | Slater et al. | |
| 2002/0170060 A1 | 11/2002 | Lyman | |
| 2004/0180675 A1 | 9/2004 | Choi et al. | |
| 2007/0195771 A1 | 8/2007 | Lu | |
| 2007/0253409 A1 | 11/2007 | Fu et al. | |
| 2008/0084847 A1 | 4/2008 | Xia et al. | |
| 2008/0165739 A1 | 7/2008 | Park | |
| 2008/0254802 A1 | 10/2008 | Ohta et al. | |
| 2009/0036152 A1 | 2/2009 | Janneteau et al. | |
| 2009/0103468 A1 | 4/2009 | Kasapidis | |
| 2009/0190587 A1 | 7/2009 | Zhao et al. | |
| 2010/0142530 A1 | 6/2010 | Zha et al. | |
| 2010/0232394 A1 | 9/2010 | Ohta et al. | |
| 2011/0053628 A1 | 3/2011 | Kim et al. | |
| 2011/0064017 A1 | 3/2011 | Hong | |
| 2011/0116504 A1 | 5/2011 | Jung | |
| 2011/0305183 A1* | 12/2011 | Hsu | H04W 72/30 370/312 |
| 2012/0224522 A1 | 9/2012 | Kim et al. | |
| 2012/0269111 A1 | 10/2012 | Um et al. | |
| 2012/0327858 A1* | 12/2012 | Alcorn | H04B 7/18506 370/328 |
| 2013/0235786 A1 | 9/2013 | Kim et al. | |
| 2013/0279397 A1 | 10/2013 | Hui et al. | |
| 2014/0011441 A1* | 1/2014 | Lauer | H04H 20/71 455/3.06 |
| 2014/0016639 A1 | 1/2014 | Ding et al. | |
| 2014/0198706 A1 | 7/2014 | Jung et al. | |
| 2015/0163848 A1* | 6/2015 | Lin | H04L 5/0037 370/329 |
| 2017/0150342 A1 | 5/2017 | Slater et al. | |
| 2018/0199184 A1 | 7/2018 | Slater et al. | |

OTHER PUBLICATIONS

International Search Report, PCT/US2016/063273, dated Feb. 27, 2017.

U.S. Appl. No. 15/806,483, Non-Final Office Action dated Oct. 29, 2018, 11 pages.

U.S. Appl. No. 15/806,483, Notice of Allowance dated Mar. 5, 2019, 8 pages.

U.S. Appl. No. 16/433,678, Notice of Allowance dated Apr. 28, 2020, 10 pages.

\* cited by examiner

MULTICAST HANDOVER FOR MOBILE COMMUNICATIONS

CROSS-REFERENCE TO RELATED APPLICATIONS

The present application is a continuation of U.S. application Ser. No. 16/939,221 filed on Jul. 27, 2020, which is a continuation of U.S. Nonprovisional application Ser. No. 16/433,678, filed on Jun. 6, 2019, which is a continuation of U.S. Nonprovisional application Ser. No. 15/806,483, filed on Nov. 8, 2017 (now U.S. Pat. No. 10,356,600), which is a continuation of U.S. Nonprovisional application Ser. No. 14/952,649, filed on Nov. 25, 2015 (now U.S. Pat. No. 9,848,317), the entire contents of all which being incorporated by reference herein for all purposes.

FIELD

Embodiments relate generally to communications systems, and, more particularly, to providing fast multicast handover to in-transport terminals moving through a multi-carrier communications system.

BACKGROUND

As usage of the Internet evolves, there has tended to be an increasing prevalence of high-data rate applications, such as streaming video. The ability of communications service providers to serve consumers with data-intensive content can be limited by variations in capacity and demand across the communications infrastructure. For example, network resource demand can spike during peak usage times of day, capacity in certain regions can be impacted by weather (e.g., rain fade, etc.), consumers in certain regions may have access to different infrastructures (e.g., fiber, satellite, etc.), and/or the ability to meet demand can change based on other conditions.

It is becoming more common for users to desire to consume streaming media while in transit (e.g., on mobile devices, like mobile phones, laptop computers, tablet computers, integrated media terminals, or other in-transport terminals; and/or in context of a car, airplane, bus, cruise ship, or other transport craft). Maintaining provision of communications services to mobile terminals can involve handing off the connection with the content provider network among multiple wireless links (e.g., multiple spot beams or cells), contending with changing connection quality (e.g., as a terminal changes its position relative to spot beams or cells, to sources of interference, etc.), adapting to changing network resource supply and/or demand (e.g., user demand in a particular spot beam coverage area at a particular time, etc.), and other difficulties. These and other attributes of in-transport content delivery can frustrate the network's ability to maintain quality of service to the mobile terminals, particularly in context of aircraft and/or other transport craft that tend to travel over a relatively large area of the network in a relatively short time.

BRIEF SUMMARY

Among other things, systems and methods are described for providing efficient multicast handover for delivery of content to in-transport terminals in multi-carrier communications systems. Embodiments operate in context of mobile terminals (e.g., client devices) consuming multicast media channel offerings as they move through a communications infrastructure having a number of carriers (e.g., beams, cells, etc.). During transport, the terminals may be serviced over time by multiple carriers, which can involve handing over servicing of the terminals among those carriers. Typically, effecting such multicast handovers can involve a number of steps, including, for example, detecting entry into a new carrier, establishing communications between the terminals and the new carrier, setting up multicasting of the media channel offering in the new carrier, and directing the terminals to join the new multicast to continue receiving the media channel offering.

Conventional approaches tend to wait until a terminal is serviced by a new carrier before establishing a multicast group in that new carrier. Establishing the multicast group can involve vying for network and/or computing resources that may be shared by other functions, on exchanging communications over links that have latency (e.g., there can be a typical roundtrip time of approximately 500 milliseconds in communications via a geosynchronous satellite), and/or on other resource limitations. These and other factors can tend to cause delay between entering a new carrier and beginning to receive multicast communications via the new carrier, and the delay can impact quality of service to the terminals.

When one or more in-transport terminals (e.g., client devices in a transport craft) are determined to be consuming a multicast media channel offering, embodiments can establish respective multicast groups to support communication of the media channel offering in each of multiple carriers. For example, the multiple multicast groups can include a first multicast group of the media channel offering for a first carrier (e.g., a carrier presently servicing one or more terminals consuming the media channel offering) and a second multicast group of the media channel offering for a second carrier (e.g., a carrier that may subsequently service the one or more terminals consuming the media channel offering). The terminals can be notified of the established multicast groups prior to being serviced by the second carrier (e.g., and/or prior to being serviced by the first carrier). For example, establishing the multicast groups can involve allocating multicast resources to those carriers for the media channel offering, and the terminals can be notified of those allocated resources. According to such pre-notification, upon handover of the terminals to a new carrier, the terminals can begin receiving multicast communication of the media channel offering via a pre-established multicast group in the new carrier in accordance with the identity (and/or other attributes) of the pre-established multicast group received by the terminals prior to entry into the new carrier (i.e., by prior notification). As such, the terminals' multicast handover can be performed without waiting for establishment of multicast groups at the time of the handover, thereby avoiding typical multicast handover-related delays.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Figure 1:
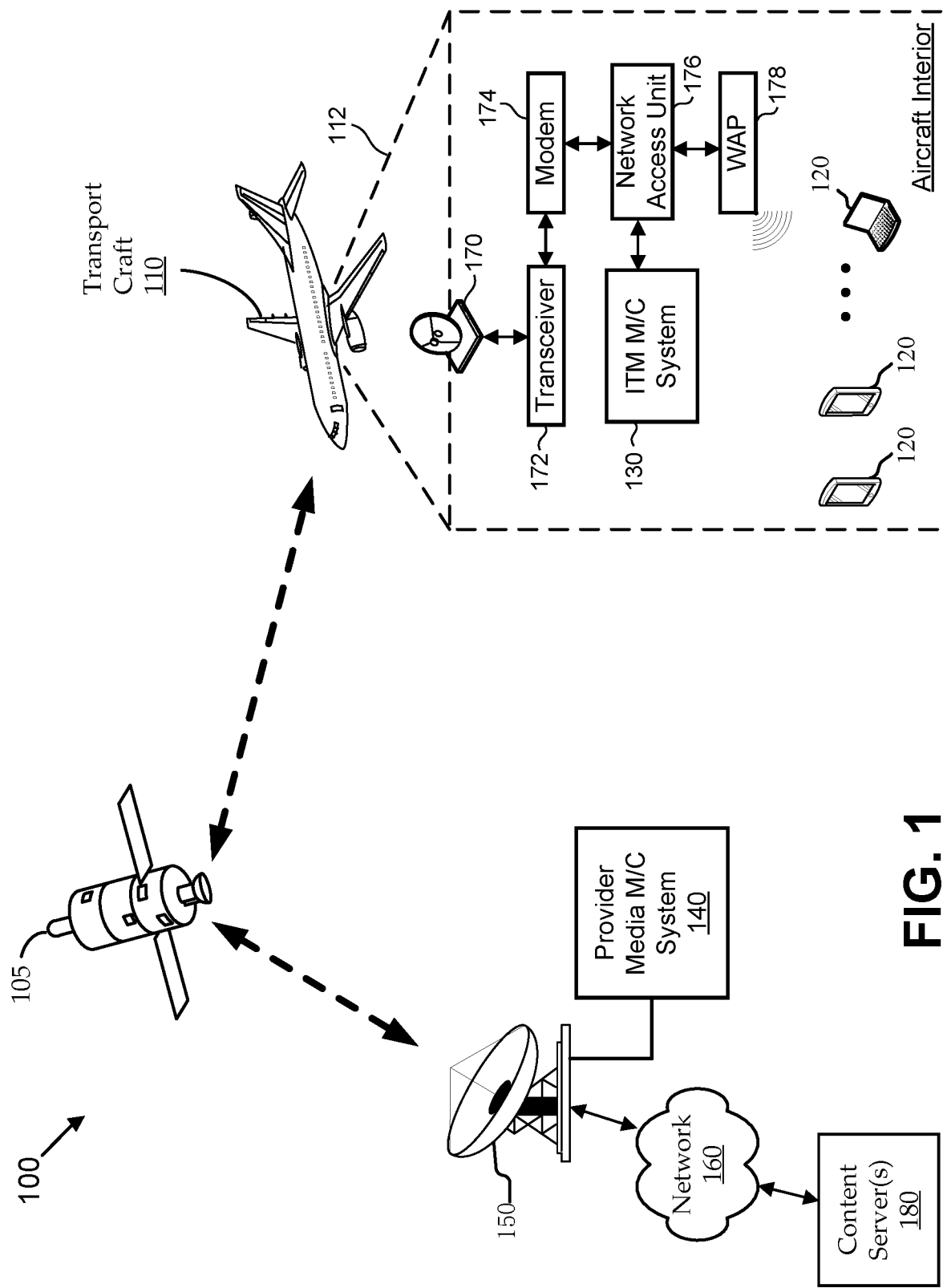
FIG. 1 shows a simplified diagram of a satellite communications system, which provides a context for various embodiments.

FIG. 1 shows a simplified diagram of a satellite communications system 100, which provides a context for various embodiments. May other configurations are possible having more or fewer components than the satellite communications system 100 of FIG. 1. In the illustrated embodiment, the satellite communications system 100 includes a transport craft 110 in communication with one or more content server(s) 180 via a satellite 105, a gateway 150, and a network 160. The gateway 150 can include, and/or be in communication with, a provider media multicast system (PMMS) 140.

The transport craft 110 can include a two-way communication system 112 to facilitate bidirectional communication with the satellite 105. In the illustrated embodiment, the two-way communication system includes an antenna system 170, transceiver 172, modem 174, network access unit 176, wireless access point (WAP) 176, and in-transport media multicast system (ITMMS) 130. The two-way communication system 112 can provide for reception of a forward downlink signal from the satellite 105 and transmission of a return uplink signal to the satellite 105 to support two-way data communications between client devices 120 within the transport craft 110 and the content server(s) 180. The client devices 120 can include mobile devices (e.g., smartphones, laptops, tablets, netbooks, and the like) such as personal electronic devices (PEDs) brought onto the transport craft 110 by passengers. As further examples, the client devices 120 can include passenger seat back systems or other devices on the transport craft 110. The client devices 120 can communicate with the network access unit 176 via a communication link that can be wired and/or wireless. The communication link can be, for example, part of a local area network such as a wireless local area network (WLAN) support by WAP 178. One or more WAPs 178 can be distributed about the transport craft 110, and can, in conjunction with network access unit 176, provide traffic switching and routing functionality; for example, as part of a WLAN extended service set (ESS), etc.

In operation, the network access unit 176 can provide uplink data received from the client devices 120 to the modem 174 to generate modulated uplink data (e.g., a transmit intermediate frequency (IF) signal) for delivery to the transceiver 172. The transceiver 172 can upconvert and then amplify the modulated uplink data to generate the return uplink signal for transmission to the satellite 105 via the antenna system 170. Similarly, the transceiver 172 can receive the forward downlink signal from the satellite 105 via the antenna system 170. The transceiver 172 can amplify and downconvert the forward downlink signal to generate modulated downlink data (e.g., a receive IF signal) for demodulation by the modem 174. The demodulated downlink data from the modem 174 can be provided to the network access unit 176 for routing to the client devices 120. The modem 174 can be integrated with the network access unit 176, or can be a separate component in some examples.

As described in more detail below, the ITMMS 130 can provide commands to the network access unit 176 to manage and distribute media channel offerings to the client devices 120 using the techniques described herein. The ITMMS 130 can provide for on-board media distribution and can include one or more media servers, media storage devices, etc. The functions of the ITMMS 130 can be implemented in hardware, instructions embodied in memory and formatted to be executed by one or more general or application-specific processors, firmware, or any combination thereof. In the illustrated embodiment, the ITMMS 130 is shown as a separate device. Alternatively, some or all of the components or features of the ITMMS 130 can be implemented within one or more other components of the two-way communication system 112. The network access unit 176 can also allow the client devices 120 to access one or more additional servers (not shown) local to the transport craft 110, such as a server storing media channels that provide in-flight entertainment.

In the illustrated embodiment, the transport craft 110 is an airplane. Alternatively, the transport craft 110 may be other than an airplane, such as a train, bus, cruise ship, etc. As illustrated, media can be obtained from the content server(s) 180 via network 160 and gateway 150 (and/or other ground terminals or other network nodes). The network 160 can be any type of network and can include for example, the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication as described herein. The network 160 can include both wired and wireless connections as well as optical links.

The content server(s) 180 can be accessible via the satellite 105 in any suitable architecture. For example, media content (e.g., audio and/or video media) can be generated by the content server(s) 180, stored at the content server(s) 180, and/or received by the content server(s) 180 via network 160; and the content server(s) 180 may be located at the gateway 150, core node, or any other suitable location of the communications infrastructure. The media content can be communicated from the content server(s) 180 to the client devices 120 (e.g., in response to requests for such media from the client devices 120), while in flight, via the satellite 105 and the ITMMS 130. Although only one content server 180 is shown to avoid over complication of the drawing, the media received by the client devices 120 may be from one or more content server(s) 180 in one or more locations. In embodiments described herein, the media content is provided in response to requests for such content from the client devices 120. In alternative embodiments, the media content may be provided without an explicit request for such content by the client devices 120, such as because of the association of the client devices 120 with transport craft 110. For example, the media content may be "broadcast" to the transport craft 110, regardless of whether any particular client device 110 is presently requesting and/or consuming the media content.

Embodiments are described in context of multi-carrier communications systems, which generally include any suitable communications environment in which mobile terminal communications can be serviced by multiple carriers as the terminal travels through the network. For example, one or more transport craft(s) 110 can include airplanes, trains, buses, cruise ships, etc.; and any or all such transport craft(s) 110 can communicate via any one or more suitable communications architecture(s) including any suitable communications links, such as satellite communications systems, air-to-ground communication systems, hybrid satellite and air-to-ground communications systems, cellular communications systems, etc.

Typically, because of the mobile nature of the transport craft 110, the communications architecture will likely involve at least one wireless communications link. Such wireless links can be generally referred to as "carriers," which can include any suitable type of communications link having any suitable one or more frequencies, phases, polarizations, etc. For example, a communication with a particular carrier can involve communicating over a respective wireless link using a particular frequency, polarization, etc. The communications system architecture can use multiple carriers to provide various features, including servicing a large service area made up of multiple carrier coverage areas (e.g., spot beam coverage areas, cell coverage areas, etc.). Carrier coverage areas can partially or fully overlap, so that certain geographic regions are serviced (e.g., concurrently) by multiple carriers. As the transport craft 110 moves through the communications network, it can move through multiple carrier coverage areas, so that communications services can be provided to the transport craft 110 via different carriers over time. For example, during a transatlantic or international airplane flight, the airplane, and the client devices 120 of passengers on the airplane, may move through a number of carrier coverage areas, and the different carriers servicing those coverage areas can be used over time to maintain communications with the transport craft 110 over a large geographic region covered during transport (e.g., the traversed region is larger than a single carrier coverage area), and/or to provide other features, such as facilitating load balancing across multiple carriers, grouping of terminals by carrier, etc. As described herein, moving transport crafts 110 among carriers can involve "handover" of communications services between those carriers.

Notably, such handovers can arise from operating in context of multi-beam communications systems that have relatively large numbers of beams (e.g., to exploit frequency reuse and/or for other reasons) and where reliable multicast is desired. For example, suppose the communications system includes tens or hundreds of carriers, and content were multicast using a single multicast group. Even if only the client devices in a single carrier fail to receive some of the multicast content (e.g., lost packets), ensuring reliable multicast can involve retransmitting the missed data across all the carriers (since the multicast group spans all the carriers). Accordingly, some embodiments described herein assume per-carrier multicast groups. With such an approach, reliable multicast can be implemented with localized retransmission of missed data only to those carriers where data was not received. However, with such an approach, a client device may be unable to stay in a multicast group as it moves into a new carrier. As such, a carrier handover can involve a multicast handover.

While those client devices 120 move through multiple carriers of the multi-carrier communications system 100, users may consume communications services (e.g., streaming media, otherwise receiving content, etc.). In some instances, the client devices 120 may consume media channel offerings (e.g., audio and/or video media linear programming, non-linear programming such as on demand audio and/or video media such as movies and television programs, other types of media, etc.) provided by one or more content servers 180, and the media channel offerings can be multicast to facilitate consumption by multiple client devices 120 within the transport craft 110 and possibly other terminals serviced by the same carrier. In some such instances, users desire to continue consuming multicast media channel offerings, regardless of whether their client devices 120 are being serviced by multiple carriers (e.g., as the transport craft 110 carrying the client devices 120 moves through multiple carriers). Embodiments provide novel techniques for fast handover of multicast communications among multiple carriers in a manner that seeks to avoid handover-related delays, which can otherwise impact media consumption experience during such handovers. As used herein, "linear programming" generally refers to any stream of content that is scheduled for delivery at a certain time (e.g., a television show run at a set time, live event, etc.). For example, by selecting a linear programming media channel offering, a user effectively elects to consume whatever scheduled media is playing on that channel at that time.

For example, the multi-carrier communications system 100 typically may not have sufficient resources to individually satisfy all media consumption demand for all client devices 120 (e.g., using unique unicast communications). Instead, embodiments exploit multicast communications to effectively share the resources used to communicate each media channel offering among multiple client devices 120 that are all consuming the same media channel offering and are all being serviced by the same carrier (i.e., permitting them all to "listen" to the same multicast communication). When any or all of those client devices 120 moves to a new carrier, they can no longer listen to the previous carrier's multicast group. As such, unless and until they join a new multicast group in the new carrier (i.e., until there is a multicast handover), they will have lost their ability to consume the media channel offering. Any multicast handover-related delay can cause a break in the availability of a media channel offering while a new multicast group is established in a newly entered carrier, which can manifest as an interruption in media service to those consuming client devices 120. For example, in the middle of watching a movie, the movie could simply become unavailable.

As described herein, embodiments provide fast handover by coordinating among multiple client-side (i.e., transport craft-side) and provider-side systems, illustrated as the PMMS 140 and the ITMMS 130, to effectively pre-establish multicast groups on multiple carriers before a handover is invoked. The PMMS 140 can be implemented as one or more computational platforms in communication with provider-side nodes of the multi-beam communications system (e.g., one implementation of the PMMS 140 can be directly or indirectly in communication with a gateway 150, core node, or any other suitable node of the provider-side communications infrastructure). The ITMMS 130 can be implemented as one or more computational platforms in communication with client-side nodes of the multi-beam communications system (e.g., one implementation of the ITMMS 130 can be directly or indirectly in communication with one or more transport crafts 110, one or more client devices 120, or any other suitable node of the client-side communications infrastructure. While various functionality is described as being performed by the PMMS 140 or the ITMMS 130, such descriptions are not intended to be limiting (e.g., certain functions of the PMMS 140 can alternatively be performed by the ITMMS 130, and certain functions of the ITMMS 130 can alternatively be performed by the PMMS 140).

Figure 2:
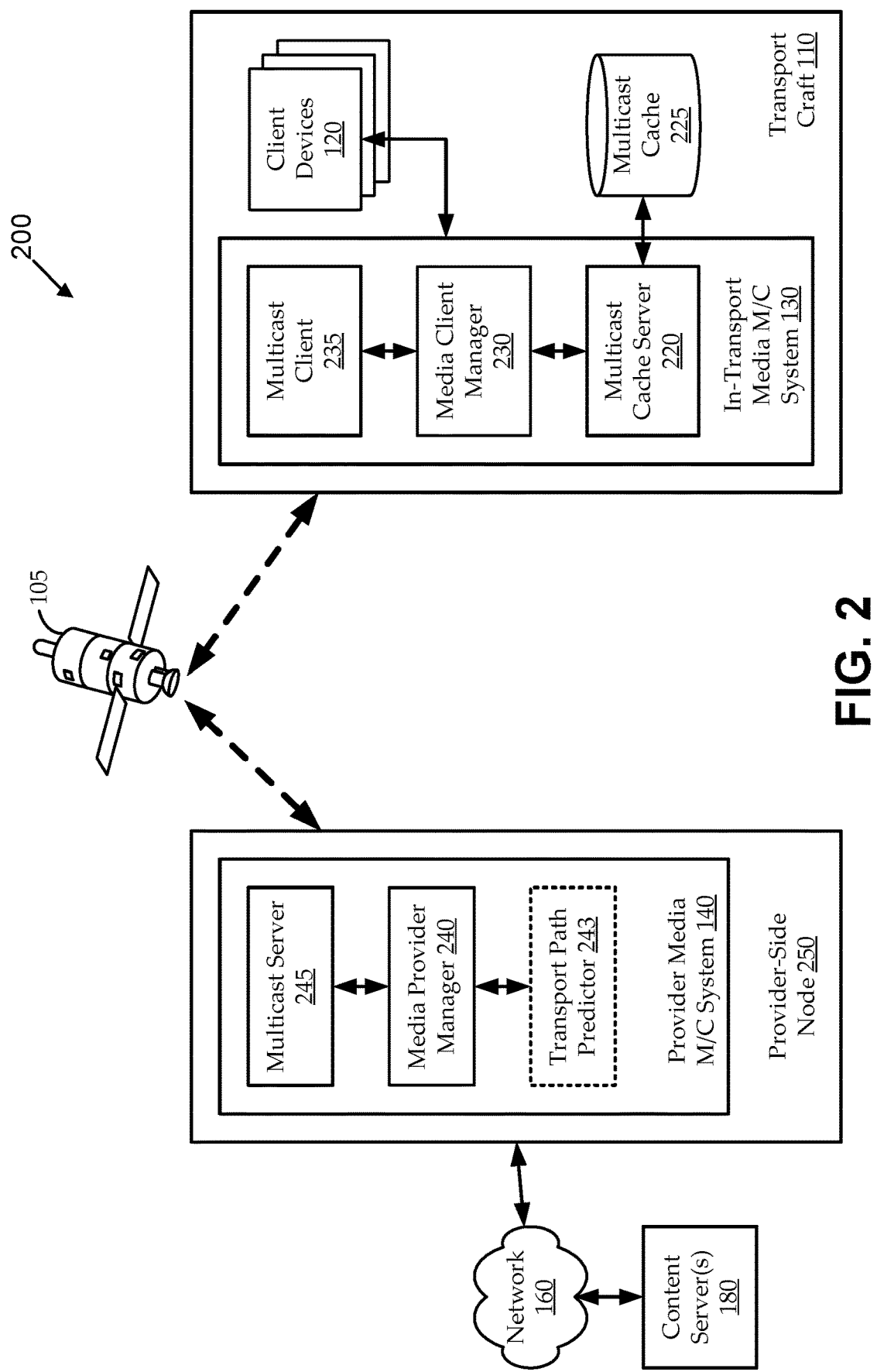
FIG. 2 shows a simplified diagram of a portion of a multi-carrier communications system, according to various embodiments.

FIG. 2 shows a simplified diagram of a portion of a multi-carrier communications system 200, according to various embodiments. The communications system 200 can be an implementation of the communications system 100 described with reference to FIG. 1. The illustrated communications system 200 includes an illustrative provider-side node 250 (e.g., representing one or more of a number of gateways, core nodes, etc.) that provides communications services via one or more satellites 105 to an illustrative transport craft 110 (e.g., representing one of multiple transport craft 110 being serviced by the communications system 200). The transport craft 110 has multiple client devices 120 disposed therein. The provider-side node 250 can be in communication with one or more content servers 180 via one or more networks 160, and the content server(s) 180 can provide media channel offerings to the client devices 120 via the communications system 200.

For the sake of providing context to embodiments, it is assumed that at least one of the client devices 120 on the transport craft 110 is consuming a media channel offering from a content source 180, and the media channel offering is being multicast to the transport craft 110 via one of multiple carriers of the communications system 200. As described above, the client device 120 can potentially be serviced (e.g., via the transport craft 110) by multiple carriers of the communications system 200 over multiple timeframes (e.g., over the course of a trip). In some instances, it can be desirable to keep multicasting the media channel offering to the client device 120, even as communications services for the transport craft 110 are handed over between carriers. Further, it can be desirable to ensure that the handover is transparent to the end user, so that consumption of the media channel offering is not interrupted or otherwise impacted during the handover.

As illustrated, embodiments of the PMMS 140 can include a multicast server 245 ("MCS") and a media provider manager 240 ("MPM"). The media provider manager 240 can establish multicast groups for the media channel offering. For example, assuming the transport craft 110 is moving through at least a first carrier and a second carrier, the media provider manager 240 can establish at least a first multicast group of the media channel offering for the first carrier and a second multicast group of the media channel offering for the second carrier. As used herein, a "multicast group" can be any suitable multicast channel that can be allocated and identified for a carrier. In some implementations, each multicast group corresponds to a multicast service data flow identified by a multicast flow identifier. In other implementations (e.g., where the number of multicast flow identifiers is limited by the architecture), each multicast flow identifier can include multiple group addresses, and each multicast group corresponds to (and is identified by) one of the group addresses in one of the multicast flow identifier in the carrier.

Establishing the multicast groups can involve allocating multicast resources for provision of the media channel offering in each respective carrier. For example, the allocated multicast resources can define any of a carrier identifier, a multicast flow identifier, a control channel address, a data channel address, etc. In some implementations, establishing the multicast group can include commencing (or continuing) multicasting of the media channel offering in accordance with the allocated resources. Some embodiments of the media provider manager 240 can determine whether a carrier is already multicasting the media channel offering and can establish the multicast group only when the carrier is not already multicasting the media channel offering. Alternatively, when the carrier is already multicasting the media channel offering (e.g., to another transport craft 110), the establishing can include identifying the multicast resources being used for the multicasting (e.g., determining the already in-use carrier identifier, a multicast flow identifier, etc.).

In some implementations, the media provider manager 240 can determine, in response to receiving a content request from the client device 120, that the content request is for a media channel offering. As one example, the media provider manager 240 can determine that the request is for one of a number of pre-identified media channel offerings (e.g., a media provider offers thirty media channels for consumption by passengers on an aircraft). As another example, the media provider manager 240 determines that the request invokes a certain type of content that indicates it is a media channel offering (e.g., the content is of a certain file type, from a certain content source 180, tagged with certain metadata, accessed through a certain portal, etc.).

Embodiments of the media provider manager 240 can establish one or more of the multicast groups before or after determining that the content request is for a media channel offering. In some implementations, the media provider manager 240 determines that the content request is for a media channel offering while the transport craft 110 is being serviced by the first carrier. In response to the determination, the media provider manager 240 can establish the multicast groups in at least the first carrier and a second carrier. In some such implementations, the media provider manager 240 can further predict whether the transport craft 110 is likely still to be consuming the media channel offering subsequent to a handover (e.g., which can involve determining how long the transport craft 110 is predicted to be serviced by one or more particular carriers). For example, where the media channel offering is a linearly programmed channel (e.g., a television channel), the duration of the programming may extend appreciably beyond the duration during which the transport craft 110 is predicted to be serviced by the present carrier. In contrast, where the media channel offering is a sporting event, or the like, the predicted or scheduled end of the media offering may be longer or shorter than the duration in which the transport craft 110 is predicted to be serviced by the present carrier. Embodiments may establish multiple multicast groups for the media channel offering only when it is determined that the duration of the media programming may extend beyond the duration in which the transport craft 110 is predicted to be serviced by the present carrier. In still other implementations, the media provider manager 240 can establish one or more of the multicast groups prior to (e.g., decoupled from) determining that the content request is for a media channel offering. For example, in implementations having a predetermined set of channel offerings, multicast groups can be established for some or all of the channel offerings in some or all carriers.

Further, the carriers in which embodiments of the media provider manager 240 establishes the multicast groups can be determined in any suitable manner. In some implementations, for each media channel offering, multicast groups are established in all carriers of the multi-carrier communications system 200. In other implementations, multicast groups are established in a subset of carriers. In some such implementations, the subset is determined geographically, for example, according to regional nature of the programming (e.g., local news or sports, programming in a particular language, etc.), rights (e.g., regional distribution rights), etc. In other such implementations, the subset is determined according to present location of the transport craft(s) 110 consuming the media channel offering. For example, the subset of carriers can be determined as some or all of the carriers adjacent to the carrier presently servicing each transport craft 110 consuming the media channel offering. In still other such implementations, the subset is determined according to a transport path of one or more transport craft 110 consuming the media channel offering. For example, a transport craft 110 can travel according to a predetermined transport path (e.g., a scheduled aircraft flight path defined according to a city pair, route, etc.). As illustrated, some implementations of the PMMS 140 can include a transport path predictor 243 that can predict some or all of a transport path for a transport craft 110 (e.g., based on city pair, trajectory, flight schedules, trends, etc.). Having determined (and/or predicted) a transport path, the subset of carriers can be determined as N next carriers along the transport path, all next carriers along the transport path, carriers along the transport path plus carriers adjacent thereto, etc. In some implementations, the subset of carriers is updated periodically, dynamically, and/or in any suitable manner at any suitable time.

Figure 3:
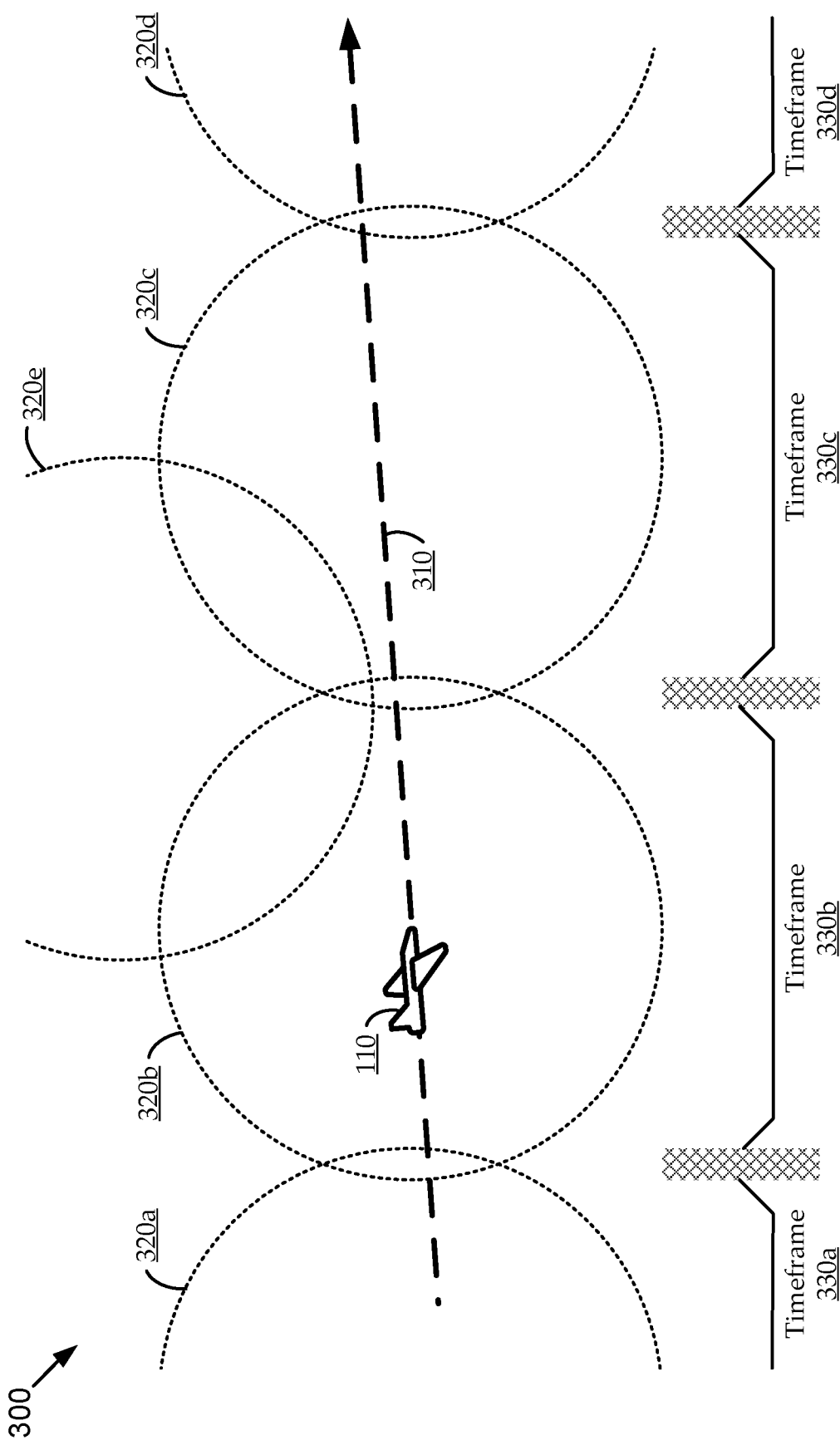
FIG. 3 shows an illustrative communications environment in which a transport craft is traveling along a transport path through multiple carrier coverage areas of a multi-carrier communications system.

For the sake of illustration, FIG. 3 shows an illustrative communications environment 300 in which a transport craft 110 is traveling along a transport path 310 through multiple carrier coverage areas 320 of a multi-carrier communications system. As illustrated, the transport craft 110 is in (or is predicted to be in) first, second, third, and fourth carrier coverage areas 320 (i.e., and serviced by first, second, third, and fourth carriers, respectively) during first, second, third, and fourth timeframes 330. As described above, in some implementations, the transport craft 110 may move between carriers for other reasons (e.g., in response to carrier failure or congestion, to use a carrier with a better present link condition, to facilitate client grouping, etc.). Each time the transport craft 110 moves to a new carrier, the transport craft 110 can be "handed over" to the new carrier, for example, by setting up a new communications channel and directing the transport craft 110 to join the new channel. The transport path 310 can represent an actual or predicted transport path 310. As illustrated, in some timeframes 330, the transport craft 110 can be within multiple carrier coverage areas 320 (e.g., where they overlap), such that it may be unpredictable exactly which carrier will be servicing the transport craft 110 at all times. Further, in some cases, a change in the transport path 310 (e.g., where the prediction is incorrect, where the flight path changes due to weather, etc.) can cause a change in which carrier is servicing the transport craft 110 at a particular timeframe 330. Accordingly, some implementations can establish multicast groups in carriers servicing adjacent carrier coverage areas 320 (e.g., carrier coverage area 320e is outside of, but adjacent to, the transport path 310).

Turning back to FIG. 2, embodiments of the media provider manager 240 can notify the transport craft 110 of the established multicast groups prior to a handover. For example, if first and second multicast groups are established for first and second carriers, respectively, while the transport craft 110 is being serviced by a first carrier, embodiments can notify the transport craft 110 of both multicast groups before there is a handover to the second carrier. In some embodiments, the media provider manager 240 notifies the transport craft 110 of some or all of the multicast groups prior to the transport craft 110 being serviced even by the first carrier. For example, in implementations having a predetermined set of media channel offerings, multicast groups can be pre-established for some or all of the channel offerings in some or all carriers, and the transport craft 110 can be notified of some or all of those pre-established multicast groups, accordingly.

The media provider manager 240 can notify the transport craft 110 of the multicast groups in any suitable manner. In some implementations, the media provider manager 240 can notify the transport craft 110 of some or all of the multicast groups by communicating a unicast and/or multicast message to the transport craft 110 that identifies the multicast group(s). In other implementations, the media provider manager 240 can notify the transport craft 110 of some or all of the multicast groups by communicating an announcement message to the transport craft 110 over a control channel. For example, the carrier can provide multiple channels of communications (e.g., concurrently) to the transport craft 110, including one or more unicast channels, one or more multicast channels, and one or more control channels; and one of the control channels can be used for notifying the transport craft 110 of one or more of the multicast groups.

Having notified the transport craft 110 of the pre-established multicast groups for the media channel offering being consumed, multicast communications with the transport craft 110 can be handed over in accordance with the pre-established multicast groups (i.e., without having to establish a new multicast group in a new carrier at the time of the handoff). For example, as client devices 120 in the transport craft 110 request the media channel offering (e.g., by requesting files, byte ranges, etc.), embodiments of the multicast server 245 can multicast the relevant portions of the media channel offering in response to those requests. While the transport craft 110 is being serviced by a first carrier, embodiments of the multicast server 245 can direct multicast delivery of the media channel offering to the transport craft 110 in accordance with a first multicast group (pre-established in association with the first carrier). When the transport craft 110 becomes serviced by a second carrier, embodiments of the multicast server 245 can direct multicast delivery of the media channel offering to the transport craft 110 in accordance with a second multicast group (pre-established in association with the first carrier). For example, the multicast server 245 can detect that servicing of the transport craft is handed over from the first carrier to the second carrier, the multicast server 245 can direct the transport craft 110 to join the second multicast group in response to the detecting. By notifying the transport craft 110 of the second multicast group prior to being handed over to the second carrier, the transport craft 110 can begin communicating (i.e., receiving multicast communications) over the second carrier substantially immediately upon handover without having to wait for setup and joining of a new multicast group. For example, upon handing over, the transport path 310 (and/or the client devices 120 presently consuming the media channel offering) can substantially immediately be able to join the control channel and any applicable data channels on the new carrier (e.g., according to a Media Access Control destination address (MACD)), without having to wait for particular messaging (e.g., a "configureCache" message for a control channel, an "announcement" message for a data channel, etc.) from another network node that sets up the multicast streams.

As described above with reference to FIG. 1, the transport craft 110 can include an in-transport media multicast system (ITMMS) 130. Embodiments of the ITMMS 130 can coordinate and communicate with the PMMS 140 to effect various media functions, including techniques described herein for multicast handover of media channel offerings. As illustrated, the ITMMS 130 can include a multicast cache server 220 ("MCCS"), a media client manager 230 ("MCM"), and a multicast client 235 ("MCC"). The multicast cache server 220 can include, and/or be in communication with, a multicast cache 225. The multicast cache 225 can be implemented using any suitable type of machine-readable storage media. For example, the multicast cache 225 can include one or more data servers, solid state memory, hard disk drives, removable storage, shared storage, etc. In some implementations, each client device 120 can have its own multicast cache 225 (or can contribute as a portion of the multicast cache 225 associated with a transport craft 110), for example, as a computer-readable medium coupled with, or integrated into, the client device 120. In other implementations, the multicast cache 225 can be coupled with, or integrated into, a transport craft 110 (e.g., the ITMMS 130), which is then in communication with one or more client devices 120. Embodiments of the media client manager 230 can detect which types of content requests are being issued by client devices 120 (e.g., requests for media channel offerings versus requests for other types of content), and can handle media requests, as appropriate, for special handling (e.g., multicast handling with efficient multicast handover, etc.). Embodiments of the multicast client 235 can receive media channel offering requests from the media client manager 230 and convert them for handling as multicast communications.

Figure 4:
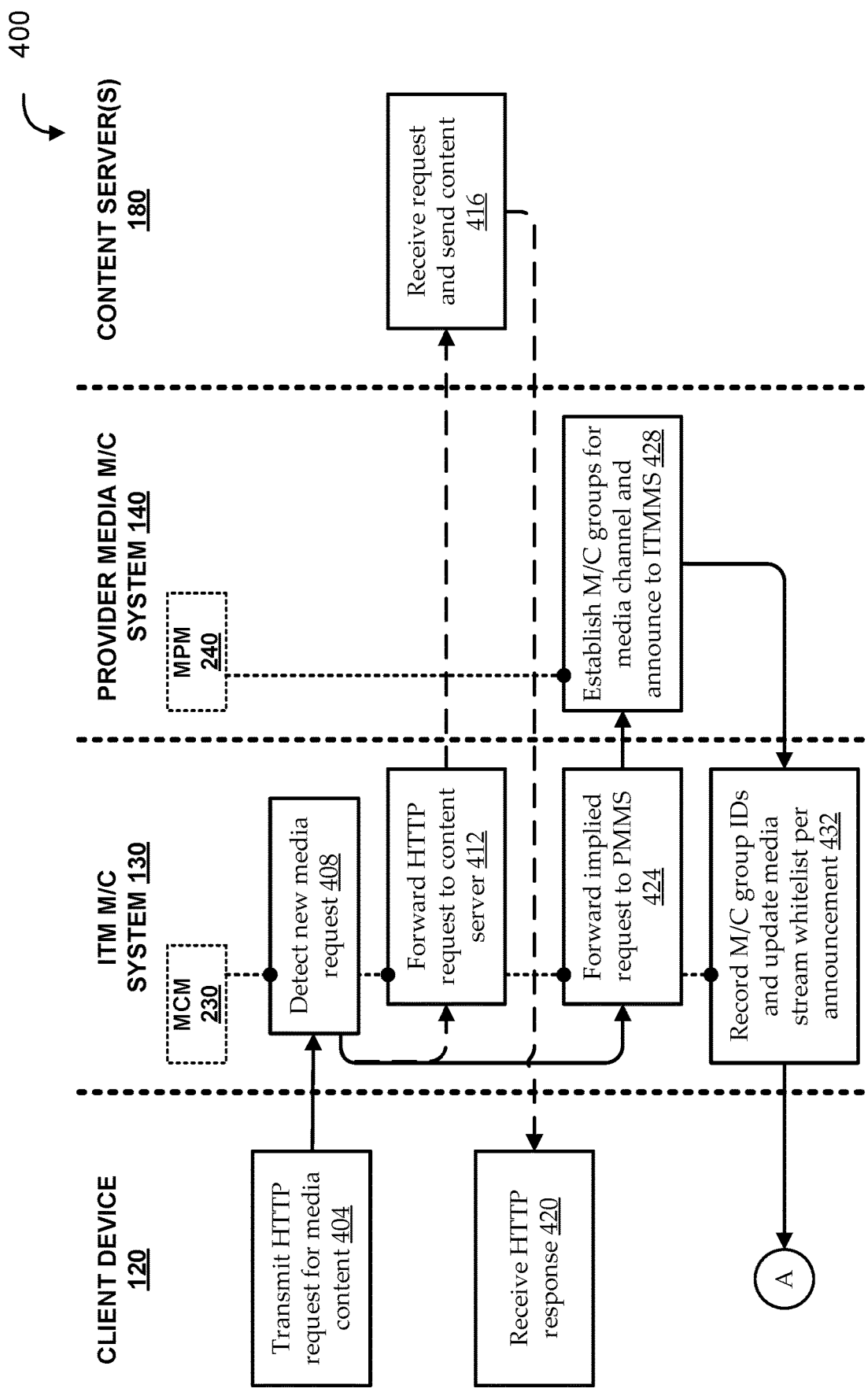
FIG. 4 shows a flow diagram of an illustrative method for setting up new multicast groups for use in implementing efficient multicast handover of a media channel offering, according to various embodiments.
Figure 5:
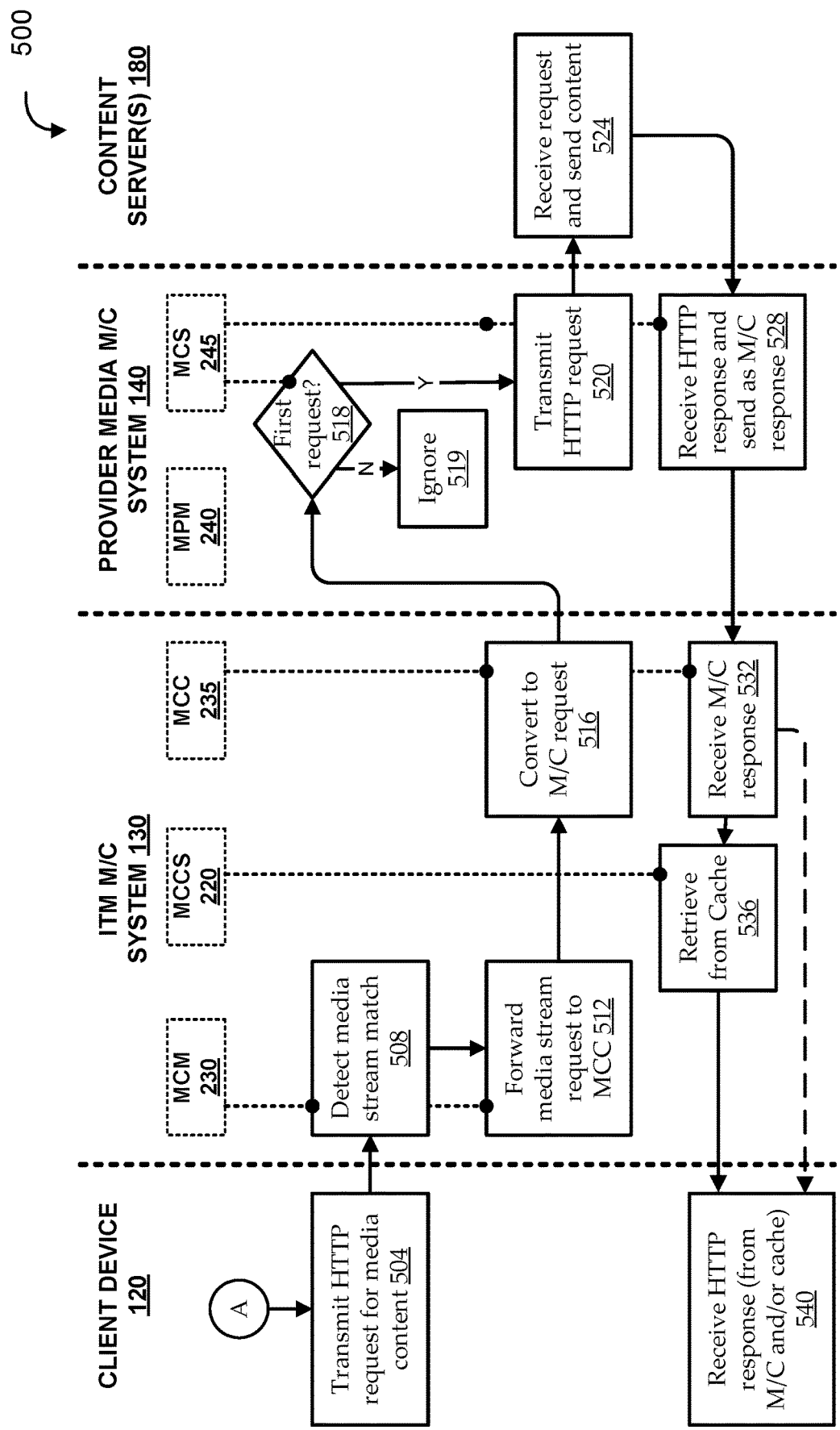
FIG. 5 shows a flow diagram of an illustrative method for providing media channel offerings over pre-established multicast groups, according to various embodiments.
Figure 6:
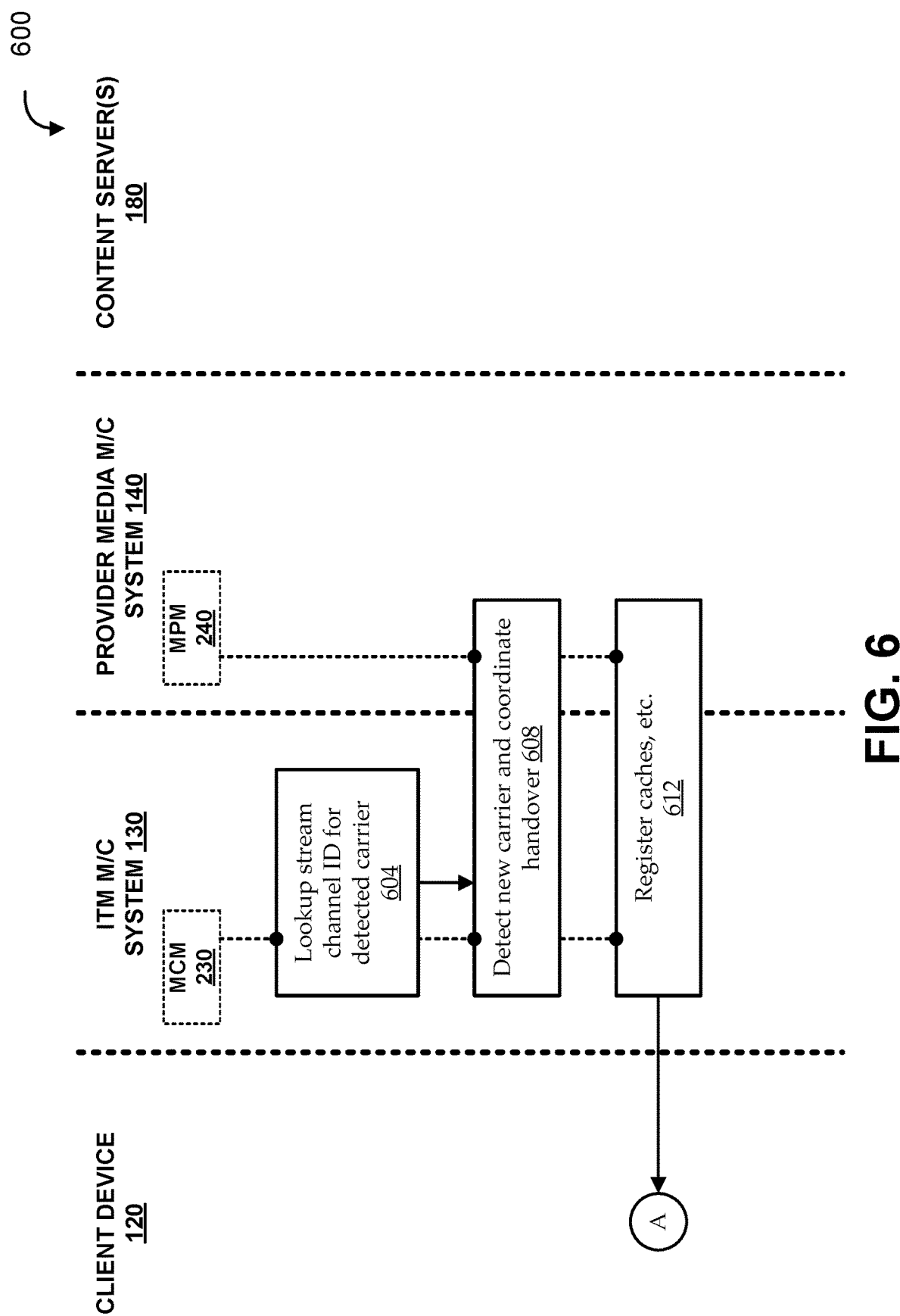
FIG. 6 shows a flow diagram of an illustrative method for handling a multicast handover using pre-established multicast groups, according to various embodiments.

Various embodiments and functionality of the ITMMS 130 and the PMMS 140 are described more fully in FIGS. 4-6. Each of FIGS. 4-6 shows a respective flow diagram in context of an illustrative client device 120, ITMMS 130, PMMS 140, and content server(s) 180. Further, FIGS. 4-6 show various subsystems and components of the ITMMS 130 and/or PMMS 140 only where useful to add clarity. Association of particular functionality with particular systems, components, etc. is intended only to add clarity and to illustrate certain implementations, and is not intended to limit the functionality only to being performed by those systems and/or components (e.g., other embodiments can be implemented in other ways).

FIG. 4 shows a flow diagram of an illustrative method 400 for setting up new multicast groups for use in implementing efficient multicast handover of a media channel offering, according to various embodiments. For example, in some implementations, the method 400 is performed only the first time particular content (e.g., a media channel offering) is requested; for any subsequent request, the multicast groups are already set up for that requested content, and such implementations can skip to FIG. 5, as described below. At stage 404, an client device 120 can transmit a content request (e.g., a hypertext transport protocol (HTTP) request) for media content. The request can be received (e.g., intercepted) by a media client manager 230 of an ITMMS 130. At stage 408, the media client manager 230 can detect that the request is a "new media" request, indicating that the request is for a media channel offering (e.g., one of an offered set of media channels, video on demand, etc.) that is not already being multicast as a multicast group on the carrier presently servicing the requesting client device (or its transport craft 110). In the context of techniques described herein, it is assumed to be desirable to handle the new media request in a manner that facilitates multicasting of the requested channel offering and efficient handover of that multicast, as appropriate.

In some embodiments, at stage 412, embodiments of the media client manager 230 can forward the request to an appropriate content server 180. This can be performed while multicast groups are being established, so that the requesting client device can begin to receive the requested media from the media server 180 substantially immediately in response to the request (e.g., as a unicast response), even though the multicast groups are not yet established. For example, at stage 416, the content server 180 can receive the request and respond with the requested media channel offering content; and at stage 420, the requesting client device 120 can receive the content from the content server 180 (e.g., as an HTTP response).

In response to detecting the new media request at stage 408, embodiments can forward an implied request for the content to the PMMS 140 at stage 424. The implied request can effectively be a multicast media request corresponding to the received request (e.g., unicast HTTP request) from the client device 120. For example, the media client manager 230 can intercept a unicast HTTP request from the client device 120 and can redirect the request, as a multicast media request, to the media provider manager 240.

At stage 428, embodiments of the media provider manager 240 can establish multicast groups for the media channel offering. As described above, establishing the multicast groups can involve setting up, for each of a number of carriers, a multicast service data flow, a group address within a service data flow, a multicast channel, or any other suitable type of multicast group by which to multicast the media channel offering over the corresponding carrier. The establishing can further involve allocating multicast resources to the multicast groups on the carriers, such as carrier identifiers (e.g., satellite identifiers, beam numbers, base station identifiers, etc.) and/or multicast group identifiers (e.g., multicast flow identifiers, control channel internet protocol (IP) address, data channel IP address, etc.). According to some implementations, establishing the multicast groups involves only allocating the resources without actually commencing the multicast communication (i.e., until a requesting client device 120 is in one of the carriers for which the multicast groups are established). In other implementations, establishing the multicast groups can include allocating multicast resources and commencing multicasting of the media channel offering over one or more of the carriers (i.e., using respective one or more multicast groups).

In some embodiments, some or all multicast groups are established for one or more media channel offerings prior to receiving any implied requests for the channels offerings. For example, an airline can provide fifty channels of linear programming to their passengers, and multicast groups can be pre-established for some or all fifty channels (e.g., all channels, the most popular channels, etc.) in some or all carriers servicing the airline (e.g., all carriers through which the airline's aircraft fly, the most frequently used carriers for that airline, all carriers in the communications network, carriers through which the airline flies plus some or all adjacent carriers, etc.). In other embodiments, the media provider manager 240 can establish some or all multicast groups in some or all carriers for the requested media channel offering at stage 428 in response to the media provider manager 240 detecting the media request at stage 408. In such embodiments, the media provider manager 240 can commence multicasting the media channel offering on at least the multicast group established for the carrier presently servicing the requesting client device 120. In some embodiments, content request can be supported in a manner that is not limited only to a discrete set of media channel offerings, and those requests can be handled in the same or other ways. For example, the same example airline described above may offer, in addition to the linear programming channels, support for normal Internet browsing, media streaming from other sources, etc. In certain implementations, any request for content other than one of the linear programming channels can be handled as a non-media request (i.e., even if the request is for media content, it is not handled using implied content requests and/or other techniques described herein). In other implementations, as described above, the media client manager 230 can determine whether client requests should be treated as media requests.

Having established the multicast groups at stage 428, the media provider manager 240 can announce the multicast groups (e.g., a table, or any other data format, including any suitable identifiers, etc.) to the media client manager 230. The announcement can be a unicast (or multicast) message to the ITMMS 130, a control message communicated on a control channel, or any other suitable communication. The announcement can be sent to any suitable set of ITMMSs 130. For example, the announcement can be sent to the ITMMS 130 of the transport craft 110 where the requesting client device 120 is disposed, to the ITMMSs of all transport crafts 110 in the same carrier, to all ITMMSs 130 in any carrier for which a multicast group has been established for the media channel offering, to all ITMMSs 130 in the network, etc.

At stage 432, the media client manager 230 can receive the announcement and can update a local list of multicast group information. For example, the media client manager 230 can record multicast group identifiers for multiple carriers and can update a local media stream whitelist. The media stream whitelist can identify (e.g., to the media client manager 230) whether a request invokes a media channel offering for which multicast groups have already been established. For example, it can be assumed that, at stage 408, the requested media channel offering is not in the whitelist of the media client manager 230, so that the media client manager 230 can determine that it is appropriate to generate and forward an implied request to the PMMS 140 in a manner consistent with establishing new multicast groups for the media channel offering. For the sake of illustration, a passenger requests "movie" via an client device 120. After the whitelist is updated at stage 432, any subsequent request for "movie" can automatically be treated as a media channel offering request (i.e., and handled using multicast techniques).

FIG. 5 shows a flow diagram of an illustrative method 500 for providing media channel offerings over pre-established multicast groups, according to various embodiments. In some embodiments, the method 500 is a continuation of the method 400 of FIG. 4. For example, reference "A" is shown in FIGS. 4 and 5 to indicate that stage 504 of method 500 can follow (e.g., immediately or after some time) stage 432 of method 400. At stage 504, an client device 120 (e.g., the same client device 120 described with reference to FIG. 4 or any client device 120 in communication with an ITMMS 130 that received a multicast group establishment announcement at stage 423 of FIG. 4) can transmit a content request (e.g., a hypertext transport protocol (HTTP) request) for media content. The requests at stage 404 and 504 can be substantially the same (e.g., both unicast HTTP requests).

The request can be received (e.g., intercepted) by the media client manager 230 of the ITMMS 130. Similar to stage 408 of FIG. 4, the media client manager 230 can detect, at stage 508, that the request is a media request. However, unlike in stage 408, the request is detected in stage 508 to invoke a media channel offering that is already being multicast as a multicast group on the carrier presently servicing the requesting client device (or its transport craft 110). The detecting can involve determining that the requested media channel offering is in the whitelist of the ITMMS 130. For example, the requested media channel offering is the same media channel offering for which multicast groups were previously established in stage 428 of FIG. 4, and which was added to the whitelist of the ITMMS 130 at stage 432 of FIG. 4. Some implementations can use multiple whitelists, or similar techniques, to differentiate between new media requests (e.g., as in stage 408) and media requests associated with established multicast groups (e.g., as in stage 508). For example, a first whitelist can include various providers, file types, and/or other indicators that the request is for "media channel offering" content; and a second whitelist can include the set of media channel offerings for which multicast groups are presently established (e.g., only the second whitelist is updated at stage 432).

At stage 512, embodiments of the media client manager 230 can forward the media request to the multicast client 235 of the ITMMS 130. The multicast client 235 can convert the media request to a multicast request at stage 516 in a manner that exploits knowledge of the established multicast group for the carrier. For example, the multicast request communicated by the multicast client can include appropriate carrier and multicast group identifiers. Embodiments of the multicast client 235 are in communication with a multicast server 245 of the PMMS 140, and the multicast client 235 can communicate the multicast request to the multicast server 245 (e.g., using multicast protocols, etc.).

In some instances, the media request is for a portion of the media channel offering (e.g., a file, a byte range, etc.) that has not yet been requested by any other clients in the carrier. For example, as multiple ITM clients 120 consume the same multicast content, they may each tend to issue substantially concurrent requests for the same portions of the content, and it can be desirable to ensure that only a single copy of the content is multicast in response to those requests. Accordingly, some embodiments effectively aggregate the requests (e.g., by collecting requests, by ignoring all but a first request, etc.) As illustrated, at stage 518, a determination can be made as to whether the request is the first request for a particular portion of the media channel offering. If not, it can be assumed that the requested portion is already being multicast to the multicast group (of which the requesting ITM client 120 is a part), and the request can be ignored at stage 519. If this is the first request for particular content, at stage 520, the multicast server 245 can transmit the received multicast request (e.g., as a unicast HTTP request, or in any other suitable manner) to an appropriate content server 180. At stage 524, the content server 180 can receive the request and respond with content corresponding to the media channel offering. The content server 180 response can correspond with the multicast server 245 request (e.g., an HTTP unicast response to an HTTP unicast request, etc.).

At stage 528, the multicast server 245 can receive the content response from the content server 180 and can send the received content as a multicast response to the multicast client 235. For example, sending the multicast response can involve converting an HTTP unicast communication from the content server 180 to a multicast communication corresponding to the carrier and multicast group IDs associated with present multicasting of the requested media channel offering to the requesting client device 120. At stage 532, the multicast response can be received by the multicast client 235.

In various embodiments, the multicast client 235 can coordinate with the media client manager 230 and/or with a multicast cache server 220 in the ITMMS 130 to provide an appropriate media response to the client device 120. The various media channel offering communications can effectively operate as unicast communications at the "ends" of the communications (i.e., from the perspective of the client devices 120 and the content servers 180), while operating as specially handled multicast communications in the "middle" (i.e., as facilitated by interactions with and between the multicast clients 235 and multicast servers 245). For example, the disposing the ITMMS 130 and the PMMS 140 in the communications path can permit the client devices 120 and the content servers 180 to send and receive standard HTTP communications, while permitting media channel offering communications to exploit multicast groups and features thereof.

In some embodiments, when the multicast client 235 receives the multicast response from the content server 180 via the multicast server 245, the multicast client 235 can communicate a corresponding response with the content to at least the requesting client device 120 at stage 532. In some implementations, multicast client 235 converts the multicast response to a protocol that corresponds to the protocol used for the transmitted content request in stage 504. For example, the multicast response can be converted to a standard, unicast HTTP response for communication with one or more client devices 120.

In some embodiments, the media channel offering communications can be handled locally when the requested content is already cached local to the client device 120 (e.g., in multicast cache 225 of the transport craft 110, as shown in FIG. 2). For example, the content request can be analyzed (e.g., before or after being intercepted, characterized, forwarded, etc. at stage 408, 412, 508, 512, etc.) by a cache manager (e.g., the multicast cache server 220 or any other suitable component) to determine whether the requested content is available locally. If the content is locally cached, some embodiments can locally fulfill the request by providing some or all of the requested content to the requesting client device 120 from the local cache. Such local fulfillment can be performed with or without also communicating the content request over the communications system (e.g., the requests and responses are only sent over the carrier when the content is not locally cached).

In other embodiments, local caching can be exploited in conjunction with multicast communications over the communications system. In some such embodiments, the multicast server 245 maintains information about what content is stored in a local cache (i.e., multicast cache 225 of FIG. 2) of the transport craft 110. For example, the multicast server 245 can maintain a cache model that is updated in any suitable manner and at any suitable times (e.g., by synchronization, by monitoring acknowledgement messages, etc.). Based on analyzing the multicast request is received from the multicast client 235 and/or the content response received from the content server 180, embodiments of the multicast server 245 can determine whether the requested content matches (or substantially matches) content in the local cache associated with the requesting multicast client 235. In one implementation, the multicast server 245 determines whether there is a match from the multicast request itself (e.g., by identifying the requested content, etc.) without involving the content server 180 (e.g., without ever communicating a corresponding content request to the content server 180). In another implementation, the matching determination is made after content is received from the content server 180. For example, the content request is communicated to the content server 180 at stage 520, some or all content is received at stage 528 from the content server 180, and the multicast server 245 determines from the received content whether there is a match with content already cached local to the requesting multicast client 235. The comparing can use file identifiers, content chunk (e.g., byte range) identifiers, fingerprints, or any other suitable manner of comparison to determine whether there is a match.

In any of the above and/or other implementations, when there is a match, the multicast response communicated from the multicast server 245 can include indications of the matching, locally cached content. For example, rather than including the requested content, the multicast response can include directory locations where the content is locally cached, highly compressed instances of the matching portions of the content, and/or any other indication of the cache storage locations. When such a multicast response is received at stage 532, the corresponding locally cached content can be retrieved from the local cache at stage 536. For example, the multicast client 235 can direct the multicast cache server 220 to retrieve appropriate content from the multicast cache 225.

At stage 540, the requested content (i.e., the media channel offering content) can be received by at least the requesting client device 120. For example, the response can be received as a unicast HTTP response. As described above, the requested content can be received as content that was multicast over the carrier from the content source 180 and/or as content that was retrieved from a local cache in response to a matching determination.

FIG. 6 shows a flow diagram of an illustrative method 600 for handling a multicast handover using pre-established multicast groups, according to various embodiments. The method 600 assumes that multicast groups have previously been established (at least in the new beam) for a media channel offering, and that at least one client device 120 (e.g., on a transport craft 110) is presently consuming the media channel offering over a carrier in a multi-carrier communications system (e.g., as in FIGS. 1 and 2). For example, the method 600 can occur sometime after completion of the method 400 of FIG. 4 and concurrent with iterations of the method 500 of FIG. 5.

At stage 604, the media client manager 230 can look up pre-established multicast group information for a multicast group associated with the media channel offering and the newly identified carrier. For example, the media client manager 230 maintains a lookup table of all pre-established multicast groups for all media channel offerings in all carriers (e.g., received at stage 432 of FIG. 4), and/or any suitable subset thereof. Stage 604 can be performed in response to any suitable indication to the media client manager 230 that a handover is desired. For example, the media provider manager 240 (e.g., or the transport path predictor 243, or any other suitable component) can detect that the transport craft is in a location where a handoff is appropriate. The location may be an overlap zone between the two carriers, or any other suitable location.

At stage 608, the media client manager 230 and the media provider manager 240 can detect that a new carrier is being used to service the client device 120 (e.g., or the transport craft 110 in which the client device 120 is disposed), and can coordinate a handover to the new carrier accordingly. For example, the transport craft 110 can be communicating with the multi-carrier communications network over a first carrier, and the communications network can assign another carrier of the communications system to communicate with the transport craft 110. As described above, this can occur when the transport craft 110 moves to another carrier coverage area and/or for other reasons. Any suitable techniques can be used for handing off communications between carriers, such as techniques used for handling mobile terminal communications in satellite and cellular communications networks. As part of the handover, the ITMMS 130 (e.g., the media client manager 230) can learn the identity of the new carrier. In some implementations, as part of the handover, the media client manager 230 (or any suitable component of the transport craft 110) can join a control channel, or the like, associated with the newly identified carrier (e.g., according to the lookup performed in stage 604). In some embodiments, at stage 612, the media client manager 230 and the media provider manager 240 can coordinate cache registration and/or other synchronizations.

Such techniques can avoid delays associated with the PMMS 140 detecting that a new multicast group is needed, allocating resources to that new multicast group, and notifying the requesting ITMMS 130 (and/or other ITMMSs 130) of the new multicast group identifiers and/or other information. Thus, the multicast handover can occur coincident with the carrier handover substantially without additional messaging over the network. For example, embodiments can implement the whitelists (e.g., the whitelists defining which media channel offerings have associated pre-established multicast groups) in a manner that is contiguous across all (or all relevant) carriers. In such a way, when a request for a same media channel offering is received and analyzed (e.g., at a subsequent iteration of stage 508) following a carrier handover, the request can still be identified as having associated pre-established multicast groups. Further, the newly applicable multicast group information can immediately be available for exploitation in multicast handling of the media channel communications over the carrier. For example, a first iteration of the method 500 of FIG. 5 (e.g., starting at page reference "A") after the multicast handover can proceed in substantially the same manner as the last iteration of the method 500 prior to the multicast handover, substantially without intervening delay.

Figure 7:
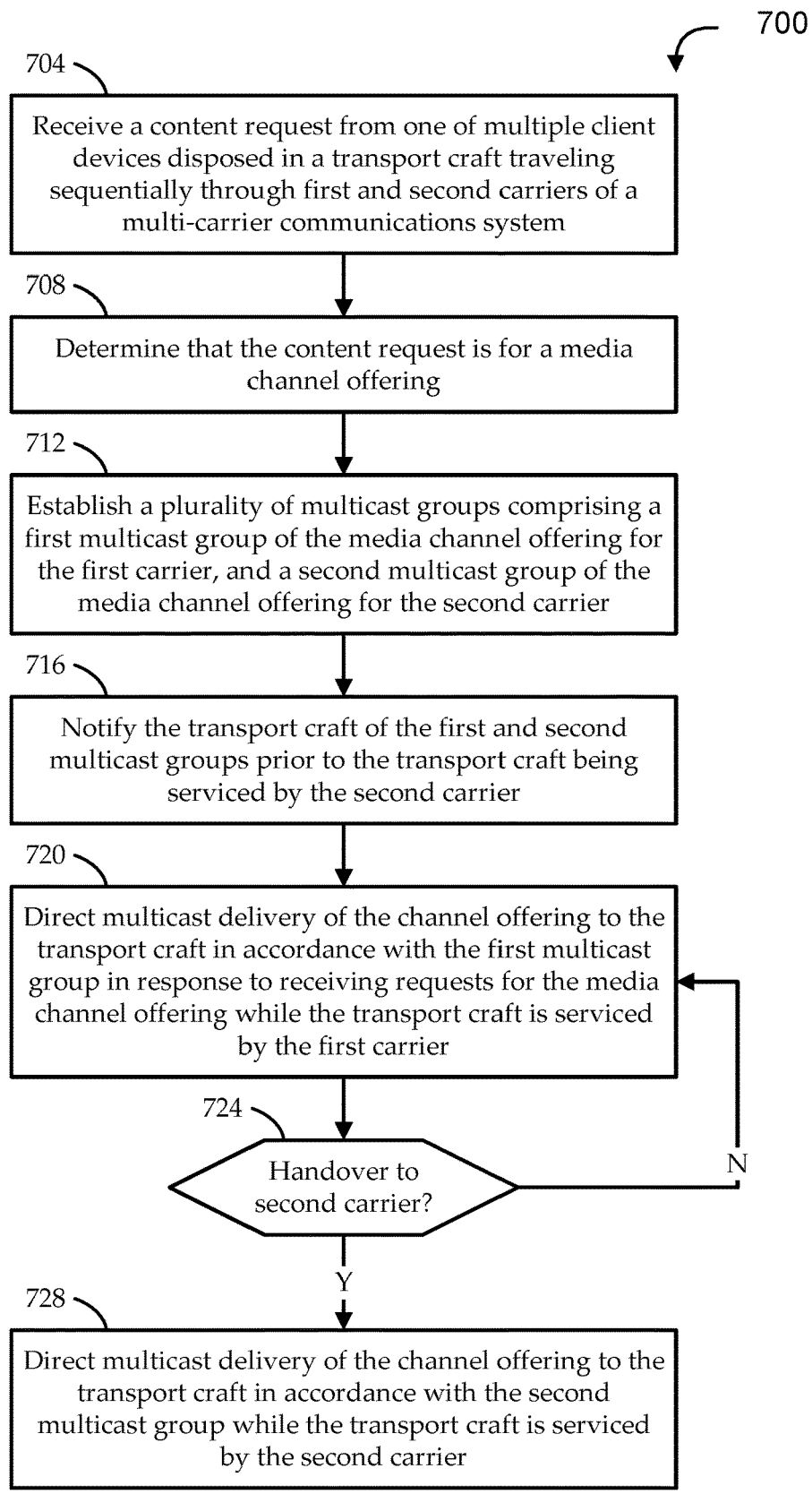
FIG. 7 shows a flow diagram of an illustrative method for multicast handover in a multi-carrier communications system, according to various embodiments.

FIG. 7 shows a flow diagram of an illustrative method 700 for multicast handover in a multi-carrier communications system, according to various embodiments. Embodiments of the method 700 can begin by receiving a content request from a client device at stage 704. For example, the client device can be one of a number of client devices 120 disposed in a transport craft 110 traveling sequentially through first and second carriers of the multi-carrier communications system (e.g., as described with reference to FIGS. 1-3). In other embodiments, the content request can be received from any suitable actual or synthetic requester. As one example, a synthetic request can be issued by a component of the PMMS 140 and/or by a component of the ITMMS 130 (e.g., in anticipation of future, actual requests by ITM clients 120). In another example, one or more actual requests can be received by ITM clients 120 in communication via other ITMMSs 130, by other client devices in the carrier (e.g., not on a transport craft 110), and/or by any other suitable requester. At stage 708, embodiments can determine that the content request is for a media channel offering.

At stage 712, embodiments can establish a number of multicast groups, including a first multicast group of the media channel offering for the first carrier, and a second multicast group of the media channel offering for the second carrier. As described above, the establishing at stage 712 can occur before (e.g., decoupled from when) the request is received at stage 704, or the establishing at stage 712 can occur after (e.g., in response to) the request received at stage 704. At stage 716, embodiments can notify the transport craft 110 of the first and second multicast groups prior to the transport craft 110 being serviced at least by the second carrier (e.g., in some implementations, before the transport craft is serviced by the first carrier). For example, the transport craft 110 can be provided with (and/or can update) a table of multicast group identifiers associated with the media channel offering across multiple carriers.

At stage 720, some embodiments can direct multicast delivery of the channel offering to the transport craft 110 in accordance with the first multicast group in response to receiving requests for the media channel offering while the transport craft is serviced by the first carrier. For example, each time a subsequent request is received for content of the media channel offering, the request is determined to be for a media channel offering having pre-established multicast groups, and the request is handled according to the pre-established multicast group information for the first carrier. At some time, a handover can occur. For example, at stage 724, a determination can be made as to whether there has been a handover to a second carrier. If not, the method 700 can proceed with multicast handling of the media channel offering requests using the first multicast group information. If there has been a handover to the second carrier, subsequent requests for the media channel offering can be handled according to a multicast handover. For example, at stage 728, some embodiments can direct multicast delivery of the channel offering to the transport craft 110 in accordance with the second multicast group in response to receiving requests for the media channel offering while the transport craft is serviced by the second carrier.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A multicast handover system onboard a transport craft, comprising:
   a network access unit operative to establish two-way communications between client devices onboard the transport craft and one or more content servers for providing channel offerings using a plurality of carriers of a communication system over a course of a trip of the transport craft; and
   an in-transit media multicast system (ITMMS) onboard the transport craft, the ITMMS operative to:
     receive an announcement from a media provider manager, prior to receiving any requests for the channel offerings from the client devices, and establish a local set of multicast group information comprising a plurality of multicast groups, each of the plurality of multicast groups corresponding to delivery of a respective one of a predetermined set of channel offerings via a respective one of the plurality of carriers based on the announcement, the local set of multicast group information being pre-established prior to receiving any requests for the channel offerings from the client devices.

2. The multicast handover system of claim 1, wherein the ITMMS receives the announcement and updates the local set of multicast group information in accordance with the announcement to prior to transport.

3. The multicast handover system of claim 1, wherein at least some of the predetermined set of channel offerings are linear programming channels.

4. The multicast handover system of claim 1, wherein the ITMMS is further operative to:
receive a request for a first channel offering of the predetermined set of channel offerings while the transport craft is being serviced by a first carrier of the plurality of carriers subsequent to receipt of the announcement;
wherein the network access unit is operative to establish communication with a first multicast group of the plurality of multicast groups for delivering the first channel offering via the first carrier in response to the request and according to the local set of multicast group information.

5. The multicast handover system of claim 1,
wherein the ITMMS is directed to join a second multicast group in response to detection of a handover event associated with the transport craft being handed over from a first carrier to a second carrier of the plurality of carriers while a first channel offering is being delivered to the ITMMS via the first carrier in accordance with a first multicast group of the plurality of multicast groups and in accordance with the local set of multicast group information; and
wherein the first multicast group is pre-established for delivering the first channel offering via the first carrier and the second multicast group pre-established for delivering the first channel offering via the second carrier.

6. The multicast handover system of claim 1, wherein each channel offering of at least some of the predetermined set of channel offerings is associated with a different subset of the plurality of multicast groups, each multicast group of the different subset being pre-established for delivering the associated channel offering via a different one of the plurality of carriers.

7. The multicast handover system of claim 1, wherein the predetermined set of channel offerings comprises N channel offerings, and the plurality of carriers comprises M carriers, such that the plurality of multicast groups comprises N times M multicast groups.

8. The multicast handover system of claim 1, wherein, for each of at least some of the plurality of carriers, at least one of a multicast service data flow for at least one of the carrier, a group address within a service data flow for the carrier, or a multicast channel for the carrier is provided.

9. The multicast handover system of claim 1, wherein each of the plurality of multicast groups is pre-established for delivering a respective one of only a most popular subset of the predetermined set of channel offerings via the respective one of the plurality of carriers.

10. The multicast handover system of claim 1, wherein:
the transport craft is associated with transporting passengers over a predefined plurality of transport paths that pass through coverage areas of a subset of total carriers of the communications system; and
the plurality of carriers is the subset of the total carriers.

11. The multicast handover system of claim 10, wherein:
the plurality of carriers is the subset of the total carriers plus at least one of the total carriers that geographically overlaps with at least one of the subset of the total carriers.

12. The multicast handover system of claim 1, wherein the communications system is a multi-beam satellite communications system.

13. A method comprising:
receiving, at an in-transit media multicast system (ITMMS) onboard a transport craft, an announcement from a media provider manager, prior to receiving any requests for channel offerings from client devices onboard the transport craft;
establishing, based on the announcement, a local set of multicast group information comprising a plurality of multicast groups, each of the plurality of multicast groups corresponding to delivery of a respective one of a predetermined set of channel offerings via a respective one of a plurality of carriers of a communication system, the local set of multicast group information being pre-established prior to receiving any requests for the channel offerings from client devices onboard the transport craft; and
initiating communication between the client devices onboard the transport craft and one or more content servers using the local set of multicast group information.

14. The method of claim 13, wherein at least some of the predetermined set of channel offerings are linear programming channels.

15. The method of claim 13, further comprising:
receiving a request for a first channel offering of the predetermined set of channel offerings at the ITMMS of the transport craft while the first transport craft is being serviced by a first carrier of the plurality of carriers subsequent to the establishing;
determining, according to the establishing, a first multicast group of the plurality of multicast groups that is pre-established for delivering the first channel offering via the first carrier; and
receiving multicast delivery of the first channel offering at the ITMMS in accordance with the first multicast group in response to the request.

16. The method of claim 13, further comprising:
receiving direction to join a second multicast group in response to a detection of a handover event and in accordance with the local set of multicast group information; and
wherein the handover event is associated with the transport craft being handed over from a first carrier to a second carrier of the plurality of carriers while a first channel offering is being delivered to the ITMMS via the first carrier in accordance with a first multicast group of the plurality of multicast groups;
wherein the first multicast group pre-established for delivering the first channel offering via the first carrier and the second multicast group pre-established for delivering the first channel offering via the second carrier.

17. The method of claim 13, wherein each channel offering of at least some of the predetermined set of channel offerings is associated with a different subset of the plurality of multicast groups, each multicast group of the different subset being pre-established for delivering the associated channel offering via a different one of the plurality of carriers.

18. The method of claim 13, wherein the predetermined set of channel offerings comprises N channel offerings, and the plurality of carriers comprises M carriers, such that the plurality of multicast groups comprises N times M multicast groups.

19. The method of claim 13, wherein, for each of at least some of the plurality of carriers, at least one of a multicast service data flow for at least one of the carrier, a group address within a service data flow for the carrier, or a multicast channel for the carrier is provided.

20. The method of claim 13, wherein each of the plurality of multicast groups is pre-established for delivering a respective one of only a most popular subset of the predetermined set of channel offerings via the respective one of the plurality of carriers.

21. The method of claim 13, wherein:
the transport craft is associated with transporting passengers over a predefined plurality of transport paths that pass through coverage areas of a subset of total carriers of the communications system; and
the plurality of carriers is the subset of the total carriers.

22. The method of claim 21, wherein the plurality of carriers is the subset of the total carriers plus at least one of the total carriers that geographically overlaps with at least one of the subset of the total carriers.

23. The method of claim 13, wherein:
for each of at least some of the plurality of multicast groups associated with each of at least some of the plurality of carriers, multicast resources are allocated comprising at least one of carrier identifiers or multicast group identifiers; and
the announcement comprises the at least one of the carrier identifiers or the multicast group identifiers.

24. The method of claim 13, wherein the local set of multicast group information indicates a set of associations between multicast group identifiers of the plurality of multicast groups and corresponding ones of the predetermined set of channel offerings and the plurality of carriers.

25. The method of claim 13, wherein the communications system is a multi-beam satellite communications system.

* * * * *